May 5, 1953 R. R. FLORAC Re. 23,651
RADIO RECEIVER
Original Filed July 29, 1950
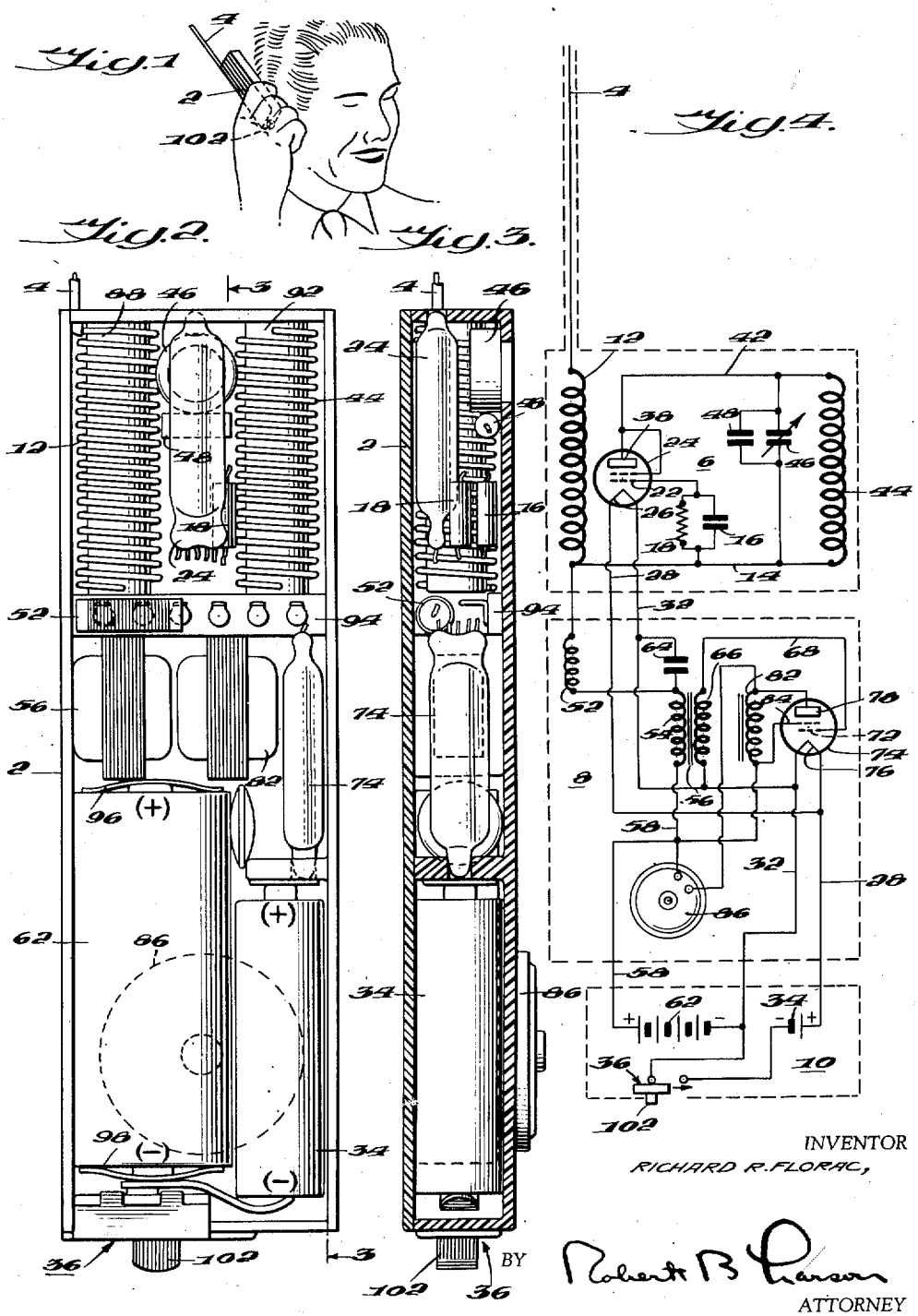
INVENTOR
RICHARD R. FLORAC,
BY Robert B. Pearson
ATTORNEY Reissued May 5, 1953 Re. 23,651

UNITED STATES PATENT OFFICE 23,651

RADIO RECEIVER

Richard R. Florac, New York, N. Y., assignor, by mesne assignments, to Aircall, Inc., New York, N. Y., a corporation of Delaware Original No. 2,619,589, dated November 25, 1952, Serial No. 176,747, July 29, 1950. Application for reissue December 29, 1952, Serial No. 328,539

8 Claims. (Cl. 250—20)

Matter enclosed in heavy brackets [ ] appears in the original patent but forms no part of this reissue specification; matter printed in italics indicates the additions made by reissue.

This invention relates to portable radio receivers, and more particularly to high-frequency personal radio receivers of the type adapted to be carried on the person of the listener.

Receivers of this general type are in increasing demand for a variety of uses. As one example, such receivers are useful in connection with telephone-answering services. In such systems the telephone of a subscriber is connected to a central station whenever the subscriber is away from his telephone. The person telephoning then can leave a message for the subscriber with the operator at the central station. In earlier systems, the subscriber from time to time telephoned the central station to ascertain whether any messages for him had been received. In the telephone-answering system made practical by the present invention, each subscriber is assigned a code number and provided with a personal battery-operated radio receiver so small that it can be carried conveniently in a vest or coat pocket. Whenever a telephone message is received for a subscriber, his code number is recorded on a suitable medium, for example, a magnetic tape, which is reproduced repeatedly, in a cycle along with the code numbers of other subscribers also being paged, and sent out over the air through a high-frequency radio transmitter. Whenever a subscriber wishes to determine whether a message has been received for him at the central station, he switches on his portable receiver and listens through one cycle of the code numbers being broadcast. If he hears his code number he knows there is a message for him which he can receive by going to the nearest telephone and calling the operator at the central station.

This telephone-answering radio-paging system has been described in order to illustrate the features and advantages of the present invention and not to imply any limitation of use. Radio receivers incorporating the present invention obviously have other utility, but are particularly advantageous for applications wherein the requirements are similar to those of the system outlined above.

The radio receiver described herein as illustrative of the present invention is small, light in weight, and simple in construction. Because of the simple circuit employed and the mechanical arrangement of the parts, highly stable operation is obtained, and the unique construction also makes possible high sensitivity with minimum drain on the batteries that provide the operating power.

One important problem in such receivers is the provision of a suitable receiving antenna. For example, if the receiver is designed to operate while it is in the pocket of the listener, the body of the listener tends to shield and to detune the receiver and an antenna must be provided which extends away from the listener and which is connected to the receiver by a suitable flexible lead wire. Obviously such an extensive antenna arrangement is undesirable. Moreover, if the receiver is to be operated while being carried in the listener's pocket it is necessary to provide some form of flexible wire connection from a head-set or earphone to the receiver. The disadvantages of such an arrangement are obvious.

The present receiver is a unitary device having a built-in antenna and earphone. It is adapted to be hand-held adjacent the ear of the user when in use, and to be carried in the pocket when not in use. A relatively short flexible wire antenna projects from the receiver and cooperates with other components within a non-shielded portion of the receiver case to provide a compact and efficient antenna system. The receiver components are uniquely arranged so that the lower portion of the receiver can be hand-held adjacent the listener's ear without the electrical capacitance of *his hand or head* [the hand] interfering with the operation or tuning of the receiver, even though its tuned circuits are unshielded and are positioned in such manner as to form an effective part of the antenna system. These advantageous effects, as well as an economy of parts, is achieved by utilizing certain of the receiver components not only to perform their usual functions but, in addition, to serve as an electrostatic shield.

Particular features of construction of the receiver are directed to minimizing the number of tubes and the power drain on the self-contained batteries. For example, the receiver requires only two single-function miniature tubes, a feature made possible by the efficient coupling and audio output circuits. The low power dissipation of the circuit is emphasized by the fact that the entire receiver requires only a single resistor element.

The complete receiver is housed in a relatively long thin case preferably of such shape that it will fit conveniently in an ordinary vest pocket. This particular shape also has the advantage of permitting the arrangement of component parts, as mentioned above, so that the radio frequency portion of the receiver is well isolated from the capacity effects of the hand and head of the listener without the necessity for added shielding elements. Without this novel and advantageous arrangement, it would be necessary to completely shield the receiver so that a large external antenna would be required to obtain the necessary sensitivity.

Other features, objects, and advantages of the present invention will be in part apparent from and in part pointed out in the following description considered in conjunction with the drawings, in which:

Figure 1 shows a radio receiver embodying the present invention being held by its user in its operating position;

Figure 2 is an enlarged elevational view of the interior of the radio receiver shown in Figure 1, the connecting leads having been omitted to show more clearly the arrangement of the major circuit components;

Figure 3 is a sectional view of the interior of the receiver taken along line 3—3 of Figure 2; and Figure 4 is a schematic diagram of the electrical circuits of the receiver.

As shown in Figure 1, the receiver is housed in a case 2, for example of polystyrene, from which projects a relatively short self-supporting antenna 4. This antenna may be rigid or flexible and may be arranged so as to be out of the way when the receiver is not in use, for example, by sliding the antenna wire longitudinally down within the case or by flexing the wire antenna down along the side of the receiver case 2 and attaching it thereto.

As shown in Figure 4, the electrical circuits may be considered as divided into three portions: an R.-F. section, generally indicated at 6; an audio amplifier and output portion, generally indicated at 8; and a power supply portion, generally indicated at 10.

The antenna 4 is connected through an antenna coil 12 to a self-quenched super-regenerative detector circuit. In this circuit the lower end of antenna winding 12 is connected by a lead 14 through a condenser 16 and a grid leak *resistor* [condenser] 18, in parallel with the condenser 16, to the control grid 22 of a miniature vacuum tube 24, which may be of any suitable type and in this example is a pentode connected to operate as a triode.

The filament 26 of this tube is connected by leads 28 and 32 to a filament supply battery 34, an off-on switch, generally indicated at 36, being connected in series with the negative supply lead 32.

The anode 38 of the tube 24 is connected by a lead 42 to one end of a parallel resonant circuit comprising a coil 44 connected in parallel with tuning condenser 46 and a fixed condenser 48. The opposite end of this tank circuit is connected to the lead 14 in the control grid circuit of tube 24.

The quench frequency of the super-regenerative detector will depend upon the characteristics of the anode-grid feed-back circuit and in particular upon the time constant of the grid-leak resistor 18 and the condenser 16.

The audio frequency signal is coupled from the lead 14 in the grid circuit of the detector tube 24 through a radio-frequency choke coil 52 to one end of the primary winding 54 of a miniature inter-stage audio transformer 56. The opposite end of this winding 54 is connected by a lead 58 to the positive terminal of a plate supply battery 62, the negative terminal of which is connected, under operating conditions, to the negative terminal of the filament supply battery 34. The end of primary winding 54 of the transformer 56 adjacent the radio-frequency choke coil 52 is by-passed to the common negative circuit of the receiver by a small condenser 64. The condenser 64 in combination with the choke coil 52 prevents the radio frequency energy in the antenna circuits from being coupled into the audio frequency circuits.

One end of the secondary winding 66 of the audio transformer 56 is connected to the common negative lead 32, and the opposite end is connected by a lead 68 to the control grid 72 of a miniature audio-amplifier vacuum tube 74, which may be of any suitable type.

The filament 76 of this amplifier tube is connected to the filament supply leads 28 and 32, in parallel with the filament 26 of the detector tube 24. The anode 78 of this tube is connected through a miniature audio-frequency choke coil or inductance 82 to the positive supply lead 58, which is connected also to the screen grid 84 of the audio output tube 74. A crystal-type earphone, diagrammatically indicated at 86, is connected in shunt with the choke coil 82 and is positioned in the front wall of the receiver case 2, as shown in Figure 3, so that it may be placed adjacent the ear of the listener.

The physical relationship of the components described above in connection with the circuit diagram of Figure 4 will be apparent from Figures 2 and 3. As shown in the latter figures, the coils 12 and 44 are supported on suitable low-loss forms 88 and 92, respectively, which for example may be of polystyrene molded in tubular form. The detector tube 24 is mounted, as shown, between these two coils near the back of the case 2. The adjustable tuning condenser 46 is mounted near the front of the case 2, directly opposite the tube 24, and the fixed condenser 48 is mounted directly beneath the variable condenser 46. The condenser 46 may be so positioned that the frequency of the tuned circuit can be adjusted by means of a tuning screw driver through a suitable opening in the case 2. However, because of the stability produced by the circuitry and arrangement of parts, it is not necessary to provide any means for adjustment of the receiver by the user for fixed-frequency applications. The antenna 4 and the antenna coil 12 are tuned to the desired fixed frequency by cutting the antenna to the length that produced optimum response characteristics.

Immediately beneath the coils 12 and 44 is a terminal strip 94 by which connections are made between the radio frequency section 6 and the audio amplifier section 8 and power supply section 10. The radio frequency choke coil 52 is positioned adjacent the terminal strip 94, as shown in Figures 2 and 3. The inter-stage transformer 56 and the output inductance 82 are mounted immediately beneath the terminal strip 94. The audio amplifier tube 74, is mounted, in inverted position, adjacent the inductance 82.

The plate supply battery 62 is mounted, as shown, near the lower end of the case 2 and its terminals at either end are protected by insulating strips 96 and 98. The filament supply battery 34 is mounted adjacent the plate supply battery 62. The switch 36 is mounted near the bottom of the case 2 and operated by a button 102, which projects through a slot in the bottom of the receiver case 2, so that the receiver can be turned on by sliding button 102 in one direction and turned off by sliding it in the opposite direction.

In the particular radio-paging application described above, the receiver is pre-tuned so that no tuning adjustments by the user are necessary. In operation, the user merely removes the receiver from his pocket, extends the antenna 4, if this is necessary, and moves the control button 102 of the switch 36 into the "on" position. The user then graps the lower end of the case 1 in his hand as shown in Figure 1, and places the earphone 86 adjacent his ear with the upper part of the receiver case 2 and the antenna 4 extending rearwardly and upwardly away from the head of the listener.

In actual practice, this receiver has been found to provide excellent sensitivity and to be sufficiently stable and selective as to be entirely satisfactory for its intended use. The drain on the supply batteries is very low so that, with intermittent operation such as would be occasioned by use in a telephone-answering system, they are certain to have an adequate life. For example, with a receiver utilizing the components hereinafter described operating in such service, battery life of several months has been obtained.

With fixed tuning, as is provided in the present receiver, it is of course essential that the electrical capacity of the hand and head of the user not affect the frequency of operation of the receiver. As explained above, this novel receiver is so arranged that the radio-frequency section 6 of the receiver is unshielded so that the coils 12 and 44 operate in conjunction with the wire antenna 4 to form a highly sensitive antenna system. These features are facilitated by the particular arrangement of the parts as described above. For example, the metal parts of the terminal strip 94, the transformer 56, the inductance 82, and the tube 74, all of which parts are at substantially the same radio frequency potential, serve as an effective barrier or shield between that portion of the case 2 which is held in the hand of the user and the radio-frequency section 6 that controls the frequency of operation of the receiver and determines its sensitivity. Thus, highly stable operation of a hand-held receiver is obtained while at the same time attaining the maximum sensitivity.

The radio frequency section 6, although basically a conventional super-regenerative receiver in which the quench frequency is determined by the time constants of the feed-back circuit between the anode 38 and the control grid 22 of tube 24, is one of utmost sensitivity and stability.

The particular circuit connections and components of the audio section 8 are such as to provide maximum output with a minimum of tubes. Thus, additional gain is provided by the use of the step-up inter-stage transformer 56, and by the output circuit connected to the anode 78 of amplifier tube 74. In this output circuit, the earphone 86, as mentioned above, is preferably a crystal-type, that is, it is a high impedance voltage-operated device having a capacitive reactance. This earphone is connected in shunt with the output choke 82 so that the capacitance of the earphone 86 in conjunction with the inductance 82 forms a parallel circuit that is resonant within the audio frequency range. Thus substantial voltage is built up across the terminals of the earphone 86 which effectively increases the gain of the receiver, resulting in a material saving in the electronic tube amplification required in the receiver.

*The capacitance and the inductance of all parts of the receiver at the upper end thereof, including the antenna 4, antenna coil 12, coil 44, other parts of the radio frequency section or detector circuit, and even the mountings of the parts and the casing material, are fixed at values at which the radio frequency section is in resonance to signals of the predetermined fixed frequency on which the receiver is to operate. Also, the receiver thus made to operate on a fixed frequency is so dimensioned and shaped that when it is held against the ear of the operator as described, the upper end of the receiver which contains the radio frequency section is positioned sufficiently away from the operator's head so that his body capacitance does not put the circuit out of resonance to said fixed frequency, i. e., does not detune the receiver.*

In one particular embodiment of the invention which has operated in a complete satisfactory manner in a radio-paging system such as that described above, the case 2, which houses the entire receiver was 5.75 inches in length, 1.75 inches in width, and 0.70 inch in depth. The total weight of the receiver was six ounces. The antenna 4 was a flexible wire between three and four inches in length, and the antenna coil 12 and the anode-grid coil 44 were each wound on a polystyrene rod 1.75 inches in length and 0.375 inch in diameter. Eighteen turns of No. 16 solid copper wire were used to form each coil, adjacent turns of each coil being spaced a distance equal to the diameter of the wire. The tuning capacitor 46 was of the variable ceramic type and was variable between three and twelve micromicrofarads. It was shunted by a two micromicrofarad fixed ceramic capacitor 48 to provide a somewhat smoother tuning characteristic. The condenser 16 in the grid circuit of the tube 24 has a capacity of twenty micromicrofarads and was shunted by a twenty-two megohm grid-leak resistor 18. The radio frequency choke coil 52 was wound on a plastic composition form 0.70 inch in length and 0.25 inch in diameter and had forty-two turns of No. 28 solid copper enameled wire. The condenser 64 was a tubular ceramic type and had a capacity of five thousand micromicrofarads. The inter-stage coupling transformer 56 had a step-up ratio of three to one, and the output choke 82 had an inductance of about forty millihenrys. The super-regenerative detector tube 24 was a type CK522AX pentode tube, connected as a triode and operating at approximately forty-three megacycles and the quench signal had a repetition frequency of approximately ten kilocycles. The audio output tube 74 was a pentode of the type CK533AX. The filaments were supplied by the battery 34, which was an ordinary one and one-half volt small-size flashlight cell, and the plate voltage was supplied by the hearing-aid-type battery 62 which delivered thirty volts.

It will thus be seen that the radio receiver embodying my invention is well adapted to attain the ends and objects hereinbefore set forth and to be economically manufactured since the separate parts are well suited to standard production methods. It is to be understood, of course, that various modifications may be made in the embodiment of my invention in order to best adapt the invention for a particular use. It is to be understood, however, that such modifications may well be within the scope and spirit of the present invention as defined and set forth in the following claims.

I claim:

1. A radio receiver of a size to be grasped in the hand to be held against the ear of the operator for receiving radio frequency transmission, comprising an elongated casing, a detector circuit including an antenna coil disposed in the upper end of said casing, the upper end of said casing surrounding said detector circuit being pervious to radio waves, an audio frequency amplifier disposed in said casing and electrically coupled to said detector circuit, a power supply for said detector and said amplifier, said casing including a hand-gripping portion located at the lower end of said casing remote from said detector circuit to prevent shielding of said detector by the hand, and a speaker located in said hand-gripping portion and connected to said amplifier.

2. A radio receiver according to claim 1 in which said hand-gripping portion of said casing includes a surface portion protruding out of the plane of one side of said casing, and in which said speaker is located in said protruding portion whereby, as the speaker is held against the ear of the operator, the protruding portion will space the main part of the casing including the detector away from the head of the operator, thus reducing shielding.

3. A receiver according to claim 1, and a flexible self-supporting antenna connected to said antenna coil and extending out from the top of said casing.

4. A radio receiver to be held against the ear of the operator for receiving radio frequency transmission, comprising a detector, an audio amplifier electrically coupled to said detector, a speaker connected to said amplifier, and a source of power for said circuit elements including at least one dry cell battery, a thin elongated plastic casing containing the components of said circuit, the thickness of said casing being just sufficient to contain said dry cell battery, said detector being located in the upper end of said casing, and a hand-gripping portion at the lower end thereof and remote from said detector to prevent shielding of the detector by the hand, said speaker being located in the hand-gripping portion of said casing, and a flexible antenna connected to said detector and extending from the top of said casing.

*5. A radio receiver of a size to be grasped in the hand and held against the ear of the operator for receiving radio signals on a predetermined fixed frequency, comprising, an elongated casing, a short antenna extending from the upper end of said casing, an antenna coil disposed in the upper end of said casing, a detector circuit disposed in the upper end of said casing, said antenna being connected to said circuit through said antenna coil, at least a portion of said casing in the vicinity of said antenna coil being pervious to radio waves to provide pickup strength with said short antenna, an audio frequency amplifier disposed in said casing and electrically coupled to said detector circuit, a power supply for said detector circuit and said amplifier, said casing including a hand-gripping portion located at the lower end of said casing remote from said detector circuit, a speaker located in said hand-gripping portion and connected to said amplifier, the capacitance and inductance of all parts of said receiver at the upper end thereof, including the upper end of the casing itself, being fixed at values at which the circuit is in resonance to signals of said predetermined fixed frequency.*

*6. A radio receiver according to claim 5 in which said hand-gripping portion of said casing includes a surface portion protruding out of the plane of one side of said casing and in which protruding portion said speaker is located, whereby as the speaker is held against the ear of the operator, the protruding portion will space the upper end of the casing away from the head of the operator so that the capacitance of the head of the operator does not render said circuit non-resonant to said fixed frequency.*

*7. A radio receiver of a size to be grasped in the hand and held against the ear of the operator for receiving radio signals on a predetermined fixed frequency, comprising, an elongated casing, a short antenna extending from the upper end of said casing, an antenna coil disposed in the upper end of said casing, a super-regenerative detector circuit disposed in the upper end of said casing, said antenna being connected to said circuit through said antenna coil, the upper end of said casing adjacent to said antenna coil and said detector circuit being pervious to radio waves for maximum pickup strength with a short antenna, an audio frequency amplifier circuit disposed in said casing and including a transformer, an audio inductance and an audio output tube, a terminal strip disposed in said casing between said circuits, said audio circuit being electrically coupled to said detector circuit through said terminal strip, a power supply for said detector and said amplifier circuits, said casing including a hand-gripping portion located at the lower end of said casing remote from said detector circuit, and a speaker located in said hand-gripping portion and connected to said amplifier circuit, said terminal strip, transformer, audio inductance and audio output tube being located in the upper part of the said hand-gripping portion immediately below said detector circuit so as to assist in shielding the detector circuit from the capacitance of the hand and head of the operator when the receiver is held against the ear during use.*

*8. A radio receiver of a size to be grasped in the hand to be held against the ear of the operator for receiving radio frequency transmission, comprising an elongated casing, a detector circuit including an antenna coil disposed in the upper end of said casing, at least a portion of said casing in the vicinity of said antenna coil being pervious to radio waves, an audio frequency amplifier disposed in said casing and electrically coupled to said detector circuit, a power supply for said detector and said amplifier, said casing including a hand-gripping portion located at the lower end of said casing remote from said detector circuit, and a speaker located in said hand-gripping portion and connected to said amplifier.*

RICHARD R. FLORAC.

References Cited in the file of this patent or the original patent

UNITED STATES PATENTS

| Number | Name | Date |
|---|---|---|
| 2,091,546 | Hruska | Aug. 31, 1937 |
| 2,147,595 | Hilferty | Feb. 14, 1939 |
| 2,508,918 | Hines | May 23, 1950 |
| 2,521,423 | Stuck | Sept. 5, 1950 |

FOREIGN PATENTS

| Number | Country | Date |
|---|---|---|
| 572,955 | Great Britain | Oct. 31, 1945 |